United States Patent [19]

Scobie

[11] Patent Number: 4,505,290
[45] Date of Patent: Mar. 19, 1985

[54] VALVE SEAT ASSEMBLY AND VALVE

[75] Inventor: William B. Scobie, Houston, Tex.

[73] Assignee: Keystone International, Inc., Houston, Tex.

[21] Appl. No.: 463,410

[22] Filed: Feb. 3, 1983

[51] Int. Cl.³ .............................................. F16K 1/226
[52] U.S. Cl. ........................................ 137/74; 251/173; 251/306; 277/26; 277/236
[58] Field of Search ............. 251/306, 305, 173, 174, 251/368; 137/74; 277/12, 26, 151, 207 R, 213, 236

[56] References Cited

U.S. PATENT DOCUMENTS

| | | | |
|---|---|---|---|
| 4,005,848 | 2/1975 | Eggleston | 251/307 |
| 4,130,285 | 12/1978 | Whitaker | 251/173 |
| 4,194,749 | 3/1980 | Bonafous | 251/306 |
| 4,196,886 | 4/1980 | Murray | 251/368 |
| 4,220,172 | 9/1980 | Stager | 251/306 |
| 4,231,546 | 11/1980 | Eggleston et al. | 251/173 |
| 4,258,901 | 3/1981 | Zinnai et al. | 251/173 |
| 4,272,054 | 6/1981 | Zinnai | 251/306 |
| 4,304,392 | 12/1981 | Maciulaitis | 251/174 |
| 4,345,738 | 8/1982 | Ripert | 137/74 |
| 4,396,199 | 8/1983 | Boyd et al. | 251/306 |
| 4,398,695 | 8/1983 | Torche | 137/74 |
| 4,410,163 | 10/1983 | Scobie et al. | 277/236 |

Primary Examiner—Martin P. Schwadron
Assistant Examiner—Sheri Novack
Attorney, Agent, or Firm—Browning, Bushman, Zamecki & Anderson

[57] ABSTRACT

A seating assembly for use in a rotary valve comprising a metallic seat ring having a radially inner metallic sealing section and a polymeric seat ring having a polymeric sealing section for sealing engagement with a valve element, each of said rings having a radially outer retaining section for mounting the respective rings in a valve body, both of said rings having an intermediate spacer section interconnecting the radially inner sealing and radially outer retaining sections. The spacer sections have convoluted runs forming interlocking formations to prevent relative radial movement of the seat rings, and there are a multiplicity of circumferential windings of strands in surrounding relation to the metallic sealing section.

11 Claims, 7 Drawing Figures

U.S. Patent  Mar. 19, 1985  Sheet 1 of 2  4,505,290
FIG. 1
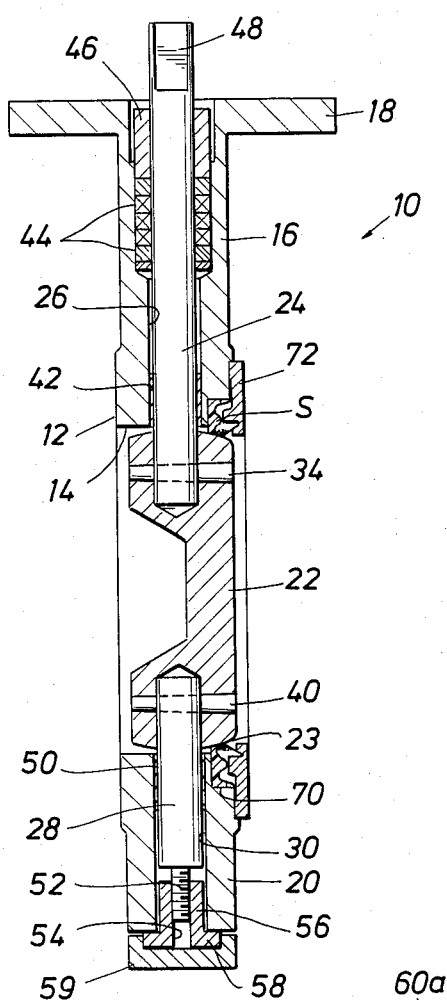
FIG. 2
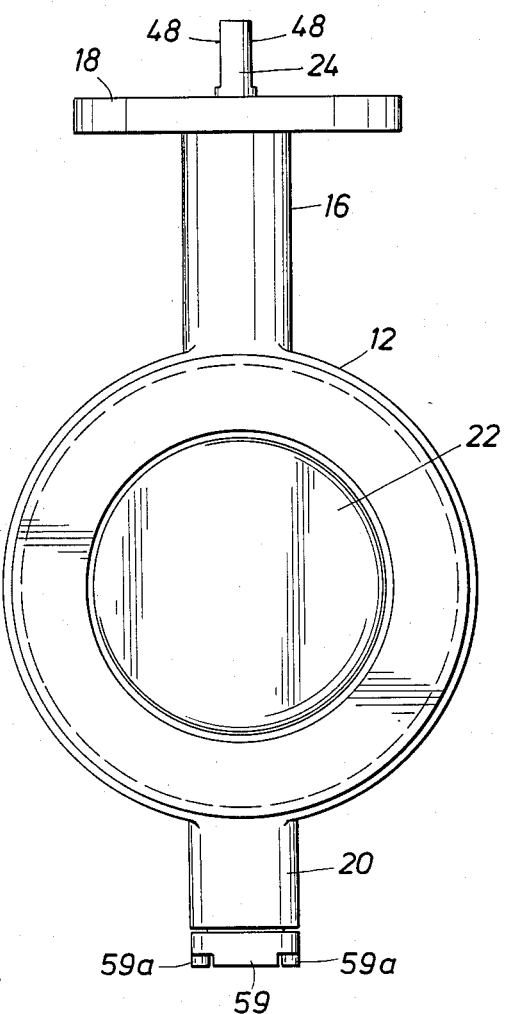
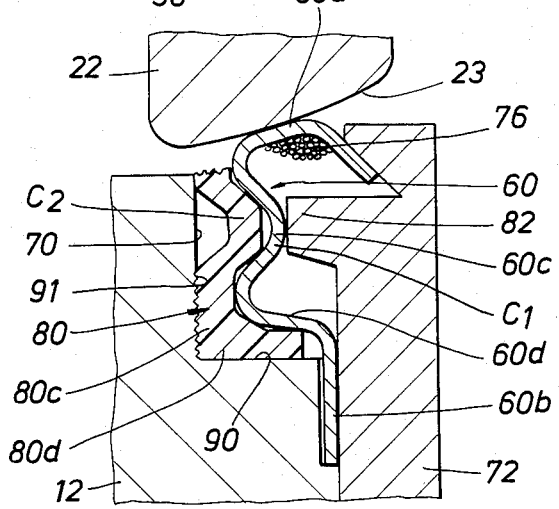
FIG. 7

VALVE SEAT ASSEMBLY AND VALVE

BACKGROUND OF THE INVENTION

The present invention pertains to rotary valves, that is to valves in which a rotatable closure element is mounted in a flowway defined by the valve body so that it may be rotated between its open and closed positions. Examples of such valves are butterfly or disc valves, ball valves, plug valves, globe valves and the like. The valve body of such an assembly, which defines the fluid flowway, particularly in the case of a butterfly or disc valve, is typically provided with an annular seat or seal engageable with the periphery of the disc to seal against fluid leakage when the valve is closed. In many cases, such valve seats may be formed of elastomeric and/or polymeric materials. However, there are numerous situations in which it is necessary, because of the chemical and/or thermal environment in which the valve is to be used to use a seat which is at least partially metallic in nature. Generally speaking, valves which are in environments subject to fire which would virtually destroy a valve seat of an elastomeric and/or polymeric material, have seat assemblies which are composite in nature having a primary sealing section of a polymeric material and a secondary sealing section of metal. Thus, in the event the polymeric sealing section is destroyed by fire, the secondary metal sealing section acts to effectively seal flow through the valve.

In certain prior art "fire safe" valves, it is necessary that the polymeric portion of the seat assembly be completely destroyed in order for the back-up metal sealing portion to be activated. This is clearly undesirable since it is quite likely that only a portion of the polymeric seat will be destroyed in which case the metallic sealing portion will not be activated at all, in which event the valve will leak which can prove to be disastrous.

The metallic sealing section of composite valve seat assemblies typically has some spring characteristics which tend to provide a certain degree of memory. However, in most instances, it is necessary to supplement these inherent properties of the seat. In the past, springs have been employed for this purpose. For example, a coil spring or garter spring might be disposed in generally surrounding relation to the metal seat, or the sealing portion thereof, to provide memory.

Such prior devices suffer from several disadvantages. For example, when used at elevated temperatures, the conventional spring will lose spring temper and cease to properly perform its function of providing memory for the valve seat. Attempts to overcome these disadvantages, while still employing conventional springs, merely result in further complication of the device and undue expense. In co-pending application Ser. No. 344,502, herein incorporated by reference for all purposes, there is disclosed an improved metal seat construction which overcomes most problems associated with prior art metallic seats for rotary valves.

SUMMARY OF THE INVENTION

In accord with one aspect of the present invention, there is provided a two-piece seating assembly for a rotary valve. The seating assembly comprises a metallic seat ring having a radially inner metallic sealing section for engaging the valve element and a polymeric seat ring having a radially inner polymeric sealing section for engaging the valve element. The seating assembly further includes a multiplicity of circumferential windings of strands of material in surrounding relationship to the metallic sealing section of the metallic seat ring and radially outwardly thereof.

In a preferred form of the seating assembly of the present invention, the metallic seat ring has a radially inner metallic sealing section for engaging the valve element, a radially outer metallic retaining section for mounting the metallic seat ring in the valve body, and an intermediate metallic spacer section interconnecting the metallic sealing section and the metallic retaining section. Preferably, the metallic spacer section has a convoluted radial run. The polymeric seat ring also has a radially inner polymeric sealing section for engaging the valve element, a radially outer polymeric retaining section for mounting the polymeric seat ring in the valve body, and an intermediate polymeric spacer section interconnecting the polymeric sealing section and the polymeric retaining section. The sealing sections of the metallic seat ring and the polymeric seat ring are axially displaced with respect to one another. It is a particular feature of the seating assembly of the present invention that when the assembly is disposed in a valve, e.g. a butterfly valve, both the polymeric sealing section and the metallic sealing section are in sealing engagement with the periphery of the valve disc, i.e. the valve element. This is to be distinguished from some prior art two-piece seating assemblies for use in fire-safe environments wherein only the polymeric section of the composite seating assembly is in contact with the valve closure element until the polymeric section is destroyed by fire or other means at which point the metallic sealing portion then engages the valve closure element.

Another feature of the seating assembly of the present invention resides in the configurations of the metallic seat ring and the polymeric seat ring and their cooperative engagement with one another. As noted, the metallic spacer section of the metallic seat ring includes a convoluted radial run which permits the metallic seat to be made relatively thin and flexible without the danger of collapse at high pressures. Moreover, this convoluted construction permits the metallic seat ring to accommodate uneven thermal expansion of the valve closure element and valve body. In the preferred case, the polymeric seat ring and the metallic seat ring have formations which are generally axially projecting as to one and receiving as to the other so as to prevent substantial relative movement between the metallic seat ring and the polymeric seat ring. In the case of the preferred embodiment wherein the metallic seat ring has a convoluted radial run in the metallic spacer section, the polymeric seat ring has a polymeric spacer section which also has a convoluted radial run, the convoluted radial run of the metallic seat ring and the convoluted radial run of the polymeric seat ring defining interengaging formations which prevent substantial relative radial movement between the two rings.

The metallic spacer section of the seat ring preferably also includes an axial run extending away from the radial run in the same general direction as the metallic sealing section but at the opposite end of the radial run of the metallic spacer section. The metallic retaining section in turn extends radially outwardly from the axial run of the metallic spacer section forming a pivot point at the intersection of the two. The polymeric retaining section has an axially projecting portion which extends in generally the same direction as the axial run of the metallic spacer section but is disposed radially outwardly thereof. Accordingly, when the seating assembly is placed in a valve, the axially projecting portion of the polymeric retaining section is trapped between the axial run of the metallic spacer section and the valve body.

The aforementioned pivoting action permitted the metal seat ring permits the seat ring to move with the valve element to accommodate changes in the magnitude and/or direction of pressure application without the loss of sealing effect. To further enhance this effect, the metallic sealing section of the metallic seat ring has a free end which, while preferably partially restrained by a suitable formation on the valve body, is permitted limited radial and axial movement. The configuration of the polymeric seat ring also permits movement in accordance with the direction of pressure on the valve in the closed position. Regardless of which side of the seating assembly pressure is applied, the polymeric seat ring is energized so as to always force it into tight engagement with the periphery of the valve element, e.g. the disc edge.

The strands may be formed of a suitable metal with properties of elasticity and tensile strength such that, at some point in the travel of the closure element, e.g. disc, to closed position, it will tend to expand the metallic sealing section of the seating assembly, and the surrounding windings, radially outwardly. Such expansion in turn sets up tensile stress in the windings. The stress generates a radially inward force resisting metallic seat expansion and not only causing a tight disc-to-seat seal, but also causing the metallic sealing section of the seat to return to its original position when the valve is opened. In other words, the aforementioned windings provide memory for the metallic seat ring. The force analysis is very similar to that involved in hoop stress in a thin pressure vessel subjected to internal pressure.

It is noteworthy that, in a valve which relies at least partly on metal-to-metal engagement for sealing, the amount of radial expansion of the metal seat ring upon closing the valve is very small. Furthermore, where the metal portion of the seat assembly is of an inherently flexible thin-walled construction, it will not offer significant resistance to the disc movement until the latter is almost fully closed. However, the high tensile windings of the present invention are capable of being activated during the last 2°-3° of disc travel and of generating sufficient disc/seat interface pressure at that point, even though the amount of further radial expansion is extremely small.

The strand windings have a number of advantages over conventional spring-type memory devices. They simplify construction, allowing axial movement and providing radial spring without the need for a fixed reference point other than the metal valve seat itself. The windings of the present invention will continue to function as a memory means at high temperatures at which conventional springs would lose spring temper. Furthermore, it can be seen that the length of one winding is substantially the same as the perimeter of the adjacent portion of the metallic sealing section of the metal seat. Thus, both the metal portion of the seat assembly and the windings may be formed of materials of similar thermal coefficients of expansion so that they will expand at approximately the same rate, and the memory windings will remain effective at elevated temperatures. It is important to note that the windings provide radial force without resistance to axial seat travel. Thus, increasing line pressure can serve to energize the flexible thin metal seat ring for an enhanced sealing effect. Yet the windings still provide radial support and resist any tendency toward radial metal seat expansion caused by such axial movement.

It is to be understood that when the valve element, e.g. disc, is in the closed position, the windings impart nearly full rigidity to the metal seat ring, strongly resisting outward radial seat movement and ensuring disc/seat interface pressure sufficient to form a tight seal. When the valve element, e.g. disc, is not in contact with the seat, i.e. when the valve is in the open position, the windings exert essentially no radial load to the metal seat ring, loading which could possibly distort the metal seat ring. This is to be distinguished from the prior art valve systems which employ springs, such as garter springs, in surrounding relationship to the metal seat to the extent that in this case, the spring is usually imparting an inwardly directed radial force on the metal seat ring even when the valve is open, the force coming from the stored energy in the spring. It is the same stored energy in the spring which is used to resist radial movement of the metal seat ring when the disc or valve element is in the closed position. This is to be distinguished from the windings of the present invention which do not rely on any stored energy in such windings. In the case of the windings of the present invention, the small but finite circumferential stretching of the windings when the disc is moved to the closed position, i.e. in full contact with the metal seat ring, sets up a small but finite tensile stress in the windings which resists any seal expansion resulting in extremely tight disc/seal engagement. The windings give the metal valve seat of the present invention greatly enhanced life. Whereas a spring such as a garter spring provides initial disc-to-seat contact thereby increasing wear on the metal seat, the windings of the present invention serve to continuously support the metal seat ring in an almost rigid fashion, again save for the small but finite radial expansion permitted by the small but finite stretching along the length of the windings which sets up high internal tensile stress in the windings. It is to be noted that in an ordinary spring, the material of the spring itself undergoes relatively little tensile stress so long as the spring is not deflected beyond its elastic limit.

Another salient feature of the present invention may best be understood by comparing the windings with a prior art solid backup ring of equivalent mechanical strength. Such a ring would cause point contact between the disc and metal seat ring, radial expansion being resisted at the point (or, strictly speaking, the annular line) of contact by the total capacity of the backup ring. The multiple windings of the present invention, on the other hand, conform to the thin metal seat configuration over a significant area and provide a progressively increasing disc/seat interface pressure as the disc approaches closed position and more and more windings are activated. This in turn eliminates a jamming problem associated with solid backup rings and also permits a greater margin for error in establishing the valve closed position.

Accordingly, it is a principal object of the present invention to provide an improved seating assembly for a rotary valve assembly.

It is another object of the present invention to provide an improved fire-safe valve assembly incorporating such a seating assembly.

Still other objects, features, and advantages of the present invention will be made apparent by the following detailed description of a preferred embodiment, the drawings, and the claims.

BRIEF DESCRIPTION OF THE DRAWINGS

FIG. 1 is a longitudinal cross-sectional view of a disc valve assembly according to the present invention, showing the disc in closed position.

FIG. 2 is an elevational view taken at right angles to FIG. 1.

FIG. 7 is a view similar to that of FIG. 4 showing relative positions of the parts after the sealing section of the polymeric sealing ring has been partially or wholly destroyed.

DETAILED DESCRIPTION

Figure 3:
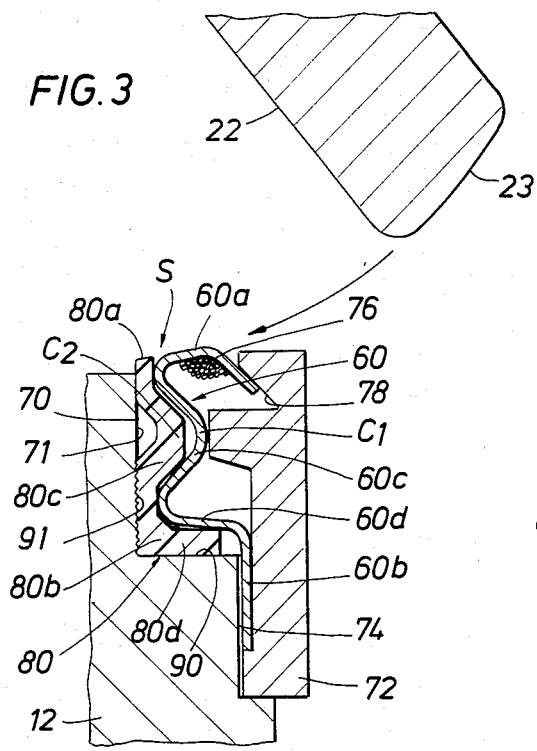
FIG. 3 is an enlarged, detailed, sectional view through a seat ring of the present invention, showing the disc intermediate its open and closed positions.

While the invention will be described with particular reference to a butterfly or disc valve, it is to be understood that it is not so limited. The valve seat described herein may be employed in any valve assembly having a rotatable valve closure element such as, for example, a ball valve, a plug valve, a globe valve, etc.

Referring first to FIG. 1, there is shown a butterfly valve 10 having a generally annular body 12 with a fluid flow passage 14 therethrough. The valve body 12 is typically adapted for positioning between opposed, pipe flanges (not shown). Extending outwardly from valve body 12 is a cylindrical neck 16 integrally formed with body 12. A flange 18 formed on neck 16 provides a means for securing an actuator (not shown) to valve 10. Diametrically opposite neck 16 and protruding from body 12 is a boss 20.

Pivotably supported in fluid flow passage 14 is a fluid control disc 22 having a peripheral sealing surface 23, surface 23 being radiused and generally forming a segment of a sphere. Disc 22 is supported by means of a first stem 24 positioned in a bore 26 of neck 16 and a second stem 28 positioned in a bore 30 of boss 20. Stem 24 is connected to disc 22 by means of pin 34. Similarly, stem 28 is connected to disc 22 by means of pin 40.

Stem 24 is journalled in bore 26 by means of bushing 42. Fluids are prevented from escaping from valve 10 through bore 26 by means of packing rings 44, which are held in position by means of a packing gland 46. The upper end of stem 24 protrudes above circular flange 18 and is provided with opposed flats 48 to provide a means for securing a hand wheel, wrench, or other device by an actuator, for rotating disc 22 to open and close the valve 10.

Stem 28 is journalled in bore 30 by means of a bushing 50. Stem 28 also has an integral stub shaft 52 projecting from its lower end which is threaded and received in a threaded bore 54 in a locator sleeve 56. Locator sleeve 56 has a flange 58 clamped between the end of boss 20 and a cover plate 59 to prevent movement of locator sleeve 56 in bore 30. Locator sleeve 56 maintains disc 22 in proper position along the axis of stem 24 and stem 28. As indicated, locator sleeve 56 is held in place by means of cover plate 59 which is secured via bolts 59a to boss 20 and counterbored to receive flange 58.

Sealing between disc 22 and body 12 around the periphery of fluid flow passage 14 is provided by means of an annular seating assembly, shown generally as S, and described more fully below. Seating assembly S is positioned in a counterbore 70 in one end face of body 12. Counterbore 70 is defined by axially facing end wall 71 and cylindrical wall 90. In addition to the body proper 12, the valve body means of the assembly include an annular retainer plate 72 secured in any suitable manner to the axial face of body proper 12 generally in opposed relation to counterbore 70.

Referring now to FIG. 3, the seating assembly S and related portions of the valve body means will be described in greater detail. Seating assembly S, which is of two-piece construction, comprises a relatively thin, somewhat flexible, integral metallic seat ring shown generally as 60 having a radially inner metallic sealing section 60a and a radially outer metallic retaining section 60b, interconnected by a metallic spacer section having a convoluted radial run 60c as well as an axial run 60d. Metallic sealing section 60a extends generally axially from the radially inner end of radial run 60c of the metallic spacer section. The axial run 60d extends from the outer extremity of radial run 60c in generally the same axial direction as radially inner metallic sealing section 60a. Metallic retaining section 60b in turn extends radially outwardly from run 60d distal run 60c and into a retaining slot 74 defined between body 12 and plate 72. As shown, metallic sealing section 60a, is generally concave radially outwardly. Surrounding metallic sealing section 60a within the concavity formed on the radially outer side thereof, are a multiplicity of circumferential windings of strands 76. Although preferably formed by a metallic wire having a thermal coefficient of expansion similar to that of the seat 60, strands 76 may be formed of any suitable material having requisite tensile strength to achieve the sealing action as described hereinbelow. In any event, the windings may comprise multiple turns of a single strand of material, or single turns of multiple strands of material, or some intermediate combination. The ends of the strand or strands are secured to one another and/or to seat 60 in any suitable manner. Metallic sealing section 60a has its free end, i.e. the end distal run 60c, disposed in a complimentarily configured notch 78 in plate 72. Notch 78 permits limited axial and radial movement of metallic sealing section 60a.

Seating assembly S also includes a polymeric seat ring shown generally as 80. Polymeric seat ring 80, which is contiguous metallic seat ring 60, has a radially inner polymeric sealing section 80a, and a radially outer retaining section 80b, interconnected by a polymeric spacer section having a convoluted radial run 80c. Polymeric sealing section 80a extends generally radially from polymeric spacer section 80c, the sealing surfaces formed by polymeric sealing section 80a and metallic sealing section 60a being in sealing engagement with the peripheral edge 23 of disc 22 and axially displaced from one another and, in general, forming surfaces which are tangential to the peripheral surface 23 of disc 22 when disc 22 is in the closed position. As can be seen, retaining section 80b has an axially projecting portion 80d which extends in generally the same direction as the axial run 60d of the metallic spacer portion of metallic seat ring 60 and which is disposed radially outwardly thereof.

As seen, in general, the convoluted portions of metallic seal ring 60 and polymeric seat ring 80 are generally complementary shaped. Thus, metallic spacer section has a convolution $C_1$ which is concave in one axial direction, i.e. to the left as shown, and convex in the opposite axial direction, i.e. to the right as shown. Likewise, polymeric seat ring 80 has a convolution $C_2$ which is concave in one axial direction, i.e. to the left as shown, and convex in the opposite axial direction, i.e. to the right as shown. It can also be seen that the convex surface defined by convolution $C_2$ is generally received in the concave surface defined by convolution $C_1$. This arrangement together with the fact that axial projection 80d is received in the annular space between axial run 60d and the cylindrical wall 90 of counterbore 70 provide an interengaging formation between metallic seal ring 60 and polymeric seal ring 80 thus preventing any substantial relative radial movement between metallic seal ring 60 and polymeric seal ring 80. In effect, the convoluted configurations of metallic seal ring 60 and polymeric seal ring 80 provide formations which are generally axially projecting as to one and receiving as to the other, i.e. the metallic seal ring 60 and the polymeric seal ring 80 are keyed to one another. This keyed fit between metallic seat ring 60 and polymeric seat ring 80 prevents extrusion of the polymeric seat ring 80 into flowway 14.

It can be seen that axially facing wall 71 of counterbore 70 is also provided with serrations or teeth 91. Thus, when seating assembly S is placed in the valve, polymeric seat ring 80 will be forced against serrations 91 by virtue of being clamped between metallic seat ring 60 which is urged against polymeric seat ring 80 by retainer plate 72. It will be appreciated that serrations 91 will bite into polymeric seat ring 80 forming a seal between valve body 12 and polymeric seat ring 80. In effect, polymeric seal ring 80 is trapped between the counterbore 70 formed in valve body 12 and metallic seal ring 60. It should be noted, however, that because of the unique configuration of polymeric seat ring 80, the polymeric sealing section 80a has some freedom of both axial and radial movement. As will be seen hereafter, this freedom of movement insures that polymeric seal ring 80, as well as metallic seat ring 60, are always in sealing contact with the peripheral edge 23 of disc 22 when the disc is in the closed position and regardless of the direction of pressure acting on the disc.

Figure 4:
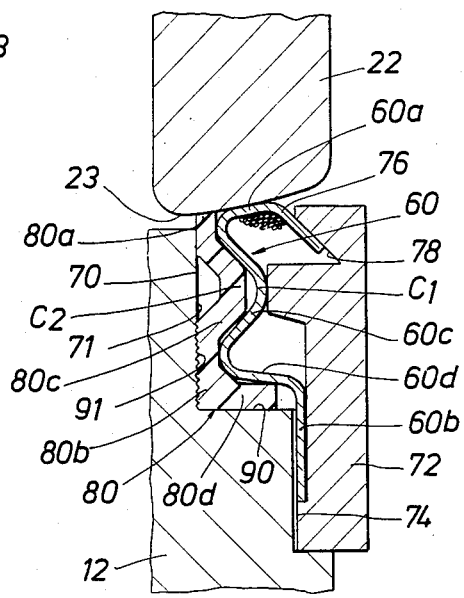
FIG. 4 is a view similar to FIG. 3 showing the disc in its closed position.

As the valve disc 22 moves from its open position to the closed position shown in FIG. 4, metallic sealing section 60a will be expanded a very small but finite amount radially outwardly. This expansion is permitted by virtue of compression of the convolutions of run 60c (compare FIGS. 3 and 4) as well as by stretching of strands 76 along this length. The latter stretching sets up tensile forces in strands 76 which in turn impart a radially inward force on metallic sealing section 60a.

Figure 5:
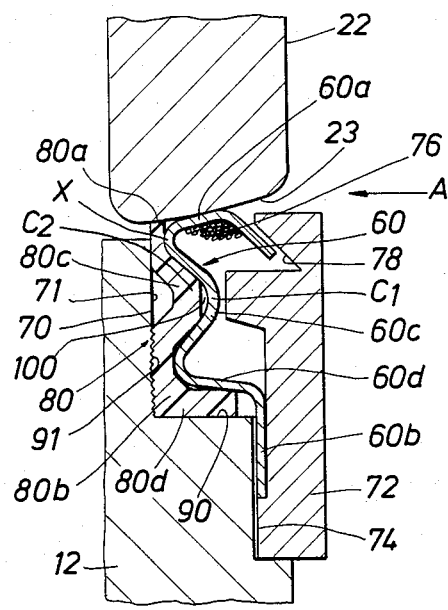
FIG. 5 is a view similar to that of FIG. 4 showing the positions of the parts upon application of fluid pressure from the right.

Referring to FIG. 5, the relative positions of the parts in the presence of fluid pressure acting in the direction of arrow A is illustrated. Pressure at A will tend to deflect disc 22 to the left, i.e. away from seating assembly S and retainer plate 72. Upon such deflection of disc 22, run 60c pivots axially about point x. Thus, metallic sealing section 60a can follow the movement of disc 22, while the tensile forces set up in strands 76 will cause metallic sealing section 60a to remain tightly sealed against the periphery 23 of disc 22 but without resisting axial deflection. It can be seen that notch 78 permits the aforementioned movement, while remaining generally in alignment with or enclosing relation to the free end of metallic sealing section 60a. Thus, notch 78 may continue to prevent excessive radial deflection of metallic seat ring 60. As metallic seat ring 60 pivots axially about point x, metallic sealing section 60a is urged radially inwardly against the peripheral edge 23 of disc 22. Any pressure which leaks past metal seat ring 60 builds up in the annular space 100 between the convolutions $C_1$ and $C_2$ on metal seat ring 60 and polymeric seat ring 80, respectively. As the pressure builds up in space 100, polymeric seat ring 80 is urged against wall 71. This causes polymeric seat ring 80 to flatten such that polymeric sealing section 80a is urged radially inwardly against the peripheral edge 23 of disc 22 thus compensating for any disc deflection away from seating assembly S caused by high pressure. Thus, polymeric seat 80 is energized by the leaking pressure past metallic seat ring 60. It will be appreciated that pressure leaking past metallic seat ring 60 cannot pass to the downstream side of the valve, i.e. to the left as shown in FIG. 5, because of sealing effected by gasket 74 and the sealing engagement between the sealing section 80b and serrations 91 in wall 91 of valve body 12.

Figure 6:
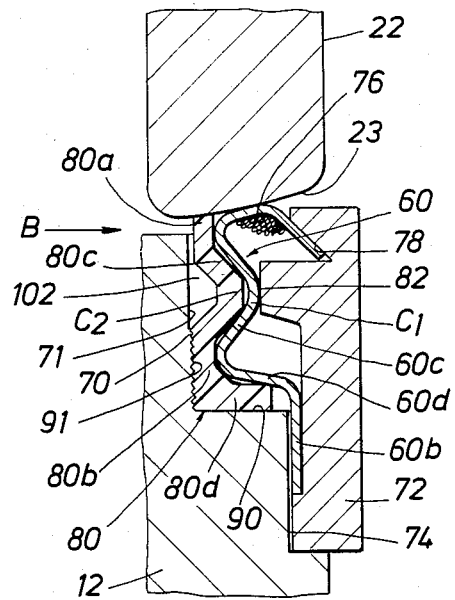
FIG. 6 is a view similar to those of FIGS. 4 and 5 showing the positions of the parts upon application of fluid pressure from the left.

Referring to FIG. 6, the positions of the parts upon the application of fluid pressure in the direction of the arrow B is shown. Disc 22 has been deflected in direction B, i.e. to the right, and metallic sealing section 60a has been permitted to follow it, by virtue of axial pivoting of the metallic spacer section 60c, 60d, generally about convolution $C_1$. Again, a tight seal between metallic sealing section 60a and disc 22 is maintained by the radially inward force imparted by the tensioned strands 76. Excessive axial movement of metallic seat ring 60 has been prevented by bottoming of the free end of metallic sealing section 60a in notch 78. At the same time that metallic sealing section 60a moves axially to follow disc deflection, pressure entering annular space 102 between polymeric seat ring 80 and wall 71 forces polymeric seat ring 80 axially toward the right, i.e. in the direction of arrow B, thus permitting the polymeric sealing portion 80a to follow any deflection of disc 22 in the direction of arrow B. This insures tight contact between the peripheral edge 23 and polymeric sealing section 80a. It should be noted that the loading caused by deflection of the disc 22 in the direction of arrow B is borne by the metallic seat ring 60 rather than by the polymeric seat ring 80. This results in less wear on the sealing surface of polymeric seat ring 80 and also reduces the tendency for polymeric seat ring 80 to cold flow if it is made of a material which is subjected to such.

The situation illustrated in FIG. 6, i.e. with pressure at B tending to move disc 22 toward metallic seat ring 60, is the one which is most likely to cause collapse of metallic seat ring 60 under extreme conditions. Such collapse is prevented by the convoluted configuration of run 60c, and of metallic seat ring 60 in general, as well as by an axial projection 82 on retainer plate 72 which opposes and abuts the convex side of the central convolution of run 60c.

Referring now to FIG. 7, there is shown a condition in which the valve 10 has been subjected to fire or such severe thermal conditions that at least the polymeric sealing portion 80a of polymeric seat ring 80 has been partially or completely destroyed. However, metallic sealing section 60a of metallic seat ring 60 is still in sealing engagement with the peripheral edge 23 of disc 22. The invention thus provides a valve which is bubble-tight when the polymeric seat ring 80 is intact and which is made fire safe by the presence of the metallic seat ring 60. Again, it should be observed that at all times when the valve is in the closed position, both the polymeric seat ring 80 and the metallic seat ring 60 are in sealing engagement with the peripheral edge 23 of disc 22. Accordingly, and regardless of the direction of pressure flow, the valve provides dual sealing from metal-to-metal interference sealing between the disc 22 and metal seal ring 60 and metal-to-polymer sealing between the disc 22 and polymeric seat ring 80.

Strands 76, as mentioned, are preferably formed of a high tensile metallic material, which may have a thermal coefficient of expansion similar to that of seat 60. However, strands 76 may also be made of other materials such as nylon or other synthetic polymeric materials, thermoplastic or thermosetting in nature, provided they have the requisite qualities of elasticity and tensile strength to impart memory to section 60a of the valve seat. It will be understood that when a fire-safe valve is desired, the strands will be metallic in nature.

The term "strand" as used herein is intended to mean an elongate member such as a filament or fiber, including monofilament, which have extremely high tensile strength and which can accommodate only a relatively small amount of stored potential energy before exceeding the elastic limit when the strand is subjected to forces which place it in tension. The strands are thus to be distinguished from springs or elastic materials which, generally speaking, unless they are stressed beyond the elastic limit of the material of construction, are considered to be perfectly elastic in nature and subject to Hookes law over a broad range of applied pressure, i.e., they can withstand large degrees of deflection without exceeding the elastic limit and yielding. Therefore, and generally speaking, the strands useful herein are considered to be inelastic in nature as opposed to a spring, an elastomeric fiber or the like. The strands useful herein may be braided, twisted or in like configurations wherein several filaments or fibers are used to form a strand or winding.

The composition of polymeric seat ring 80 can vary considerably depending upon the environment in which the valve and/or valve seat is to be used. The term "polymeric" as used herein, is intended to include virtually any type of natural or synthetic polymeric material, both thermoplastic and thermosetting in nature, such as, without limitation, polyfluorocarbon resins, polyurethanes, rubbers, polymers and halogenated alkenes such as polyvinylchloride, polyvinylidene chloride and the like, blends of various polymeric and resinous materials, blends of polymeric materials with various fibrous of fabric materials, etc. However, because the valve and/or valve seat of the present invention are primarily intended for usage in high temperature or fire prone environments, it is preferred to use polymeric materials which exhibit chemical inertness and high thermal stability. Suitable such materials include polytetrafluoroethylene, polymonochlorotrifluoroethylene, polyphenylene sulfide, organosilicone polymers and the like. Particularly preferred are fire-resistant fluorocarbon resins such as polytetrafluoroethylene, polymonochlorotrifluoroethylene and the like.

The polymeric seat ring 80 can, with advantage, be comprised of a polymeric substance in admixture with a particulate filler, the polymeric substance serving as the matrix for the filler, the filler preferably being of a material which is wear resistant and imparts lubricity to the seat structure. Suitable fillers include titanium dioxide, mixtures of alumina and titanium dioxide, mixtures of titanium dioxide and ceramic materials. A particularly preferred filler comprises a metallurgical composite of globular-shaped titanium carbide bonded by a high alloy metallic matrix. This material comes in powder form, in a variety of particle sizes, and can be made with a variety of alloys to achieve desired properties of oxidation, corrosion and wear resistance. Particularly desirable materials for use in the polymeric seat ring of the valve seats of the present invention comprise blends of the alloy carbide filler powders with various fluorocarbon polymers, polyamides, polyurethanes or polyphenylene sulfides. The alloyed carbide filler powders exhibit superlative lubricity and wear resistant properties as well as excellent durability, strength and hardness. Because of these properties, the incorporation of such filler powders into the polymeric seat rings of the seating assemblies of the present invention provide several unexpected advantages. For one, because of their high lubricity, the torque required to open and close a valve element is substantially reduced. On the other hand, because the powders are extremely hard, they actually have a lapping or polishing effect on the peripheral edge or sealing portion of the valve closure element, e.g. the disc, such that any galling of the disc that occurs in use can be, in part, compensated for by this lapping action. The filler can be incorporated in the polymer matrix by techniques well known to those skilled in the art.

The foregoing represents only one preferred embodiment of the invention, and it will be understood that numerous modifications may suggest themselves to those skilled in the art. Accordingly, it is intended that the scope of the present invention be limited only by the claims which follow.

What is claimed is:

1. A rotary valve assembly comprising:
   valve body means defining a fluid flowway, said valve body means comprising a body proper and a retainer member secured to one axial side of said body proper, a retaining slot being defined between opposed faces of said body proper and said retainer member, said body proper having a counterbore in said one axial side of said body proper, axially inwardly of said retaining slot, said counterbore having an axially facing wall;
   a valve element disposed in said flowway and rotatably mounted for movement between an open position and a closed position;
   a seating assembly carried on said valve body means and circumferentially surrounding said flowway for sealing engagement with said valve element in said closed position, said seating assembly comprising
      a metallic seat ring having a radially inner metallic sealing section for sealing engagement with said valve element, a radially outer metallic retaining section received in said retaining slot and clamped between said valve body and said retainer member, and an intermediate metallic spacer section interconnecting said metallic sealing section and said metallic retaining section, said spacer section of said metallic seat ring having a convoluted radial run, said metallic sealing section extending generally axially from said convoluted radial run of said metallic spacer section, said metallic spacer section further comprising an axial run extending from said radial run in generally the same direction as said metallic sealing section, said metallic retaining section extending radially outwardly from said axial run distal said radial run and into said retaining slot;

and a polymeric seat ring contiguous said metallic seat ring and having a radially inner polymeric sealing section for sealing engagement with said valve element, a radially outer polymeric retaining section for mounting said polymeric seat ring in a valve body and an intermediate polymeric spacer section interconnecting said polymeric sealing section and said polymeric retaining section, said spacer section of said polymeric seat ring having a convoluted radial run;

said polymeric retaining section being received in said counterbore, at least a portion of said polymeric retaining section being disposed against said axially facing wall of said counterbore, at least a portion of said radial run of said metallic spacer section of said metallic seat ring being urged against said polymeric retaining section by said retainer member whereby at least a portion of said retaining section of said polymeric seat ring is clamped between said portion of said radial run of said metallic spacer section and said axially facing wall;

said metallic sealing section and said polymeric sealing section being axially displaced with respect to one another.

2. The valve assembly of claim 1 wherein said metallic seat ring and said polymeric seat ring have formations generally axially projecting as to one and receiving as to the other to prevent substantial relative radial movement between said metallic seat ring and said polymeric seat ring.

3. The valve assembly of claim 2 wherein the convoluted radial run of said metallic seat ring and the convoluted radial run of said polymeric seat ring defining interengageable formation preventing substantial relative radial movement between said metallic seat ring and said polymeric seat ring.

4. The valve assembly of claim 1 within said seat ring is an integral, flexible, metal ring.

5. The valve assembly of claim 1 further comprising a multiplicity of circumferential windings of strands of material surrounding said metallic sealing section radially outwardly thereof.

6. The valve assembly of claim 1 wherein said metallic sealing section is concave radially outwardly, said windings being disposed in the concavity defined by said metallic sealing section.

7. The valve assembly of claim 1 wherein said strands are formed of a metal having high tensile strength.

8. The valve assembly of claim 3 wherein said metallic sealing section extends generally axially from said convoluted radial run of said metallic spacer section, said metallic spacer section further comprising an axial run extending from said radial run in generally the same direction as said metallic sealing section, said metallic retaining section extending radially outwardly from said axial run distal said radial run and into a retaining slot defined in said valve body means.

9. The valve assembly of claim 1 wherein said annularly extending axially facing wall is provided with serrations for gripping said polymeric retaining section of said polymeric seat ring.

10. The valve assembly of claim 1 wherein said metallic spacer section is generally axially pivotable at the intersection of said metallic retaining section and said axial run of said metallic spacer section.

11. The valve assembly of claim 5 wherein each of said windings comprise an elongate strand of said material, each of said strands having its centerline oriented substantially circumferentially with respect to said sealing section for generally the full length of said winding.

* * * * *

UNITED STATES PATENT AND TRADEMARK OFFICE
CERTIFICATE OF CORRECTION

PATENT NO. : 4,505,290
DATED : March 19, 1985
INVENTOR(S) : William B. Scobie

It is certified that error appears in the above—identified patent and that said Letters Patent is hereby corrected as shown below:

In Column 11, line 39, change "2" to --1--.

Signed and Sealed this

Twenty-third Day of December, 1986

Attest:

DONALD J. QUIGG

Attesting Officer     Commissioner of Patents and Trademarks